United States Patent [19]

Hamisch, Jr.

[11] 4,049,357

[45] Sept. 20, 1977

[54] SLIDING COUPLING DEVICE FOR A LANYARD OR THE LIKE

[75] Inventor: Paul H. Hamisch, Jr., Franklin, Ohio

[73] Assignee: Monarch Marking Systems, Inc., Dayton, Ohio

[21] Appl. No.: 682,126

[22] Filed: Apr. 30, 1976

[51] Int. Cl.² .............................................. F16G 11/00
[52] U.S. Cl. ................................ 403/209; 24/115 H; 24/128 R; 220/4 E; 16/125; 24/73 A
[58] Field of Search ............ 24/128 R, 115 H, 115 G, 24/249 SL, 255 SL, 73 A, 115 R; 403/209; 220/4 E; 16/125; 339/75 P, 107

[56] References Cited

U.S. PATENT DOCUMENTS

| 860,189 | 7/1907 | Chatfield | 24/115 H |
|---|---|---|---|
| 1,891,947 | 12/1932 | Powell | 24/115 H |
| 2,090,860 | 8/1937 | Bonat | 24/115 H |
| 2,631,449 | 3/1953 | Protsman | 24/115 R |
| 2,899,097 | 8/1959 | Haskins | 220/4 E |
| 3,257,023 | 6/1966 | Braverman | 220/4 E |
| 3,364,500 | 1/1968 | Fox | 24/115 H |
| 3,755,859 | 9/1973 | Solari | 24/255 SL |
| 3,897,161 | 7/1975 | Reinwall | 24/134 QA |

FOREIGN PATENT DOCUMENTS

| 1,300,273 | 6/1962 | France | 24/249 SL |
|---|---|---|---|
| 1,047,113 | 12/1953 | France | 24/115 R |
| 471,052 | 2/1929 | Germany | 403/209 |
| 679,938 | 7/1939 | Germany | 24/115 G |

Primary Examiner—Bernard A. Gelak
Attorney, Agent, or Firm—Jacox & Meckstroth

[57] ABSTRACT

A first portion or section of a flexible wrist cord is connected to a second portion or section of the cord by a sliding coupling device including a pair of mating identical housing sections which are assembled to form a housing having an internal cavity. A hook-like clip portion projects from each housing section on one side of the cavity and snap fits into a corresponding aperture within the other housing section to form a positive attachment of the housing sections. The housing sections also cooperate to define openings for receiving the cord sections, and the cavity provides space for receiving opposite knotted end portions of the cord or a crimped fastener which connects opposite end portions of the cord. The cavity also provides for extending the cord sections directly through the housing in parallel spaced relation or for crossing the cord sections when it is desired to increase the sliding friction of the coupling device along the cord sections.

9 Claims, 6 Drawing Figures

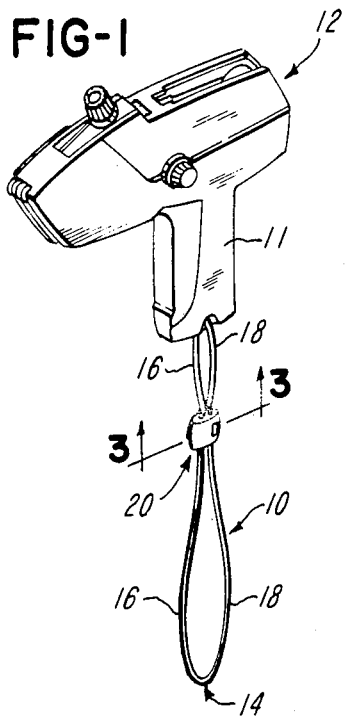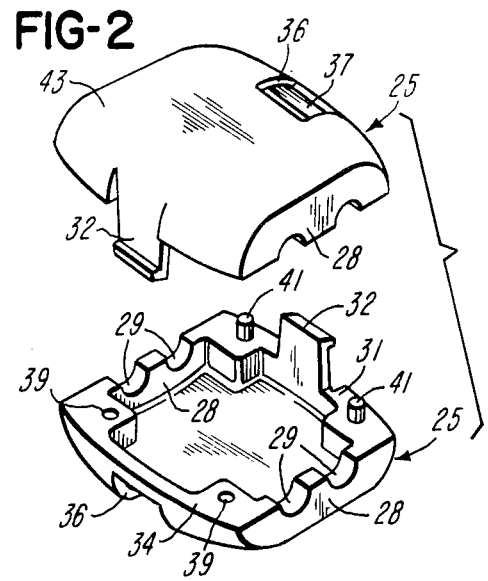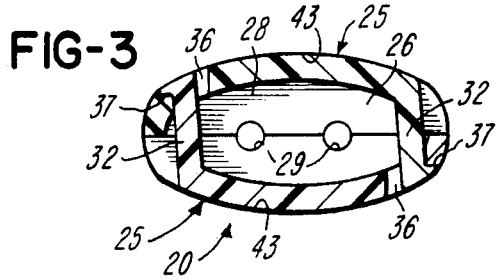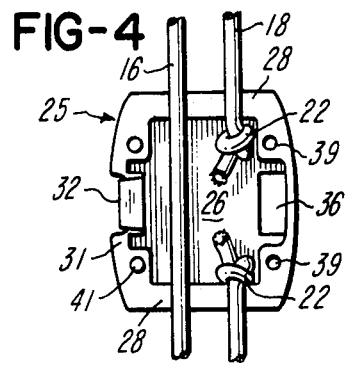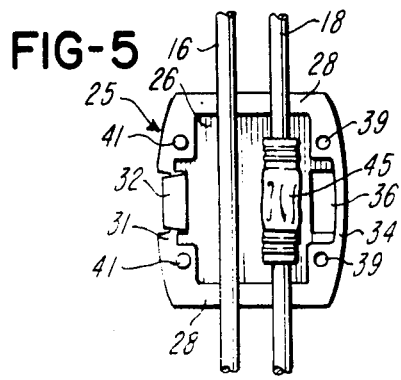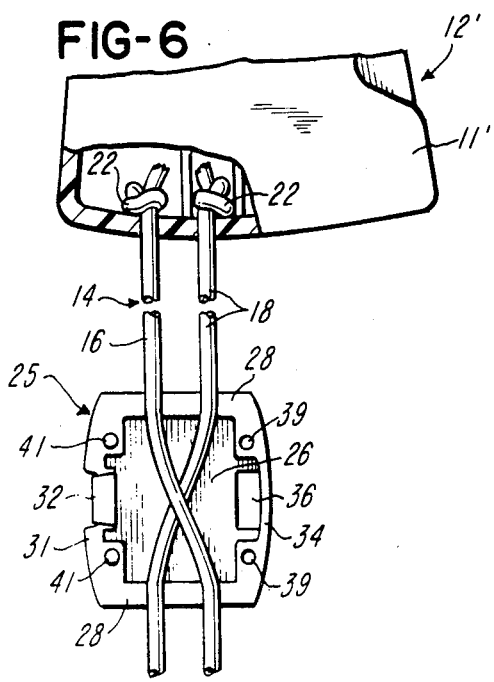

SLIDING COUPLING DEVICE FOR A LANYARD OR THE LIKE

BACKGROUND OF THE INVENTION

In the construction of lanyards which are used for protecting a hand held portable article such as a portable labeler or game racket, there have been various types of coupling devices either constructed or proposed for mounting on two portions or sections of a safety chain or cord and for sliding along one or both of the cord sections to secure the cord to a person's wrist. For example, U.S. Pat. No. 534,946 discloses a flexible chain-like cord which receives a sliding clasp having a lining to create friction when the clasp is moved along the cord. U.S. Pat. No. 3,364,500 discloses another form of clasp assembly which receives a flexible cord in the form of a bolo tie, and U.S. Pat. No. 3,897,161 discloses a sliding clasp or lock assembly which is adapted to grip the cord sections. The assignee of the present invention has also produced a sliding coupling device which has a body with parallel spaced openings for receiving corresponding sections of a cord and wherein one of the passages receives a tapered tubular plug which is cemented into the body for securing opposite end portions of the cord within the passage.

SUMMARY OF THE INVENTION

The present invention is directed to an improved coupling device for connecting a first section of a flexible cord to a second section and for providing for relatively sliding movement between the device and at least one of the cord sections. As used herein, the term cord is intended to include any elongated flexible member which is adapted to extend around an article or portion of a person's body. The coupling device of the invention is of simplified and inexpensive construction and provides for a quick and positive assembly onto adjacent cord sections. The coupling device of the invention further provides for flexibility in that it can be attached to the cord sections in different forms, depending on the construction of the article which receives the flexible cord and the preferred form of attachment. That is, the coupling device may be attached in a manner which provides for sliding movement of the coupling device relative to both cord sections or relative to only one of the cord sections. The coupling device also provides for receiving opposite end portions of the flexible cord and for securing the end portions to the coupling device, according to the type and stiffness of the cord which is used.

The above features and advantages of a coupling device constructed and assembled in accordance with the invention and other features and advantages will become apparent from the following description, the accompanying drawing and the appended claims.

BRIEF DESCRIPTION OF THE DRAWING

FIG. 1 is a perspective view of a flexible cord and coupling device constructed in accordance with the invention and which is used as a safety wrist lanyard for a portable label printer and applicator;

FIG. 2 is an enlarged exploded perspective view of the cord coupling device shown in FIG. 1;

FIG. 3 is an enlarged transverse section of the coupling device taken generally on the line 3—3 of FIG. 1, but with the cord sections removed;

FIG. 4 is a plan view of one of the housing sections forming part of the coupling device shown in FIGS. 1–3 and illustrating its assembly onto sections of a flexible cord;

FIG. 5 is a plan view similar to FIG. 4 and illustrating a modified assembly of the coupling device onto a flexible cord having connected opposite end portions; and FIG. 6 is another view similar to FIG. 4 and illustrating the assembly of the coupling device of the invention to sections of a flexible cord having end portions terminating within the handle of a portable labeler similar to the type shown in FIG. 1.

DESCRIPTION OF THE PREFERRED EMBODIMENTS

Referring to FIG. 1, a lanyard assembly 10 is illustrated in the form of a safety wrist cord extending from the handle portion 11 of a hand held portable label printer and applicator unit 12, for example, of the type illustrated in U.S. Design Pat. No. 227,932 which issued to the assignee of the present invention. The lanyard assembly 10 includes an elongated flexible cord 14 which extends through a hole or eyelet formed within the outer end of the handle portion 11 of the labeler unit 12 and includes generally parallel cord sections 16 and 18. The cord sections 16 and 18 are connected together by a coupling device 20 which slidably receives the cord section 16 (FIG. 4) and confines opposite knotted end portions 22 of the cord 14.

In accordance with the present invention, the coupling device 20 is formed by two mating housing sections 25 which are identical in construction and are each molded of a rigid thermoplastics material. When the housing sections 25 are assembled (FIG. 3), the sections cooperate to define an internal chamber or cavity 26. The corresponding mating end walls 28 of the housing sections 25 cooperate to define a pair of circular openings 29 which extend to and are connected by the cavity 26.

Each of the housing sections 25 also includes a side wall 31 which incorporates an outwardly projecting clip portion 32 having a hook-like cross-sectional configuration. The opposite side wall 34 of each housing section 25 has a generally rectangular opening or aperture 36 which is in part defined by a flat surface or shoulder 37. The side wall 34 of each housing section 25 also includes a pair of spaced corner holes 39, and a corresponding pair of studs or pins 41 project from the opposite side wall 31 of each housing section 25. Each of the housing sections 25 also has a smoothly curved or oval shaped outer surface 43 which is interrupted along one side by the corresonding aperture 36.

As illustrated in FIG. 3, when the mating housing sections 25 are pressed together, the clip portion 32 of each housing section springs slightly inwardly when it projects into the aperture 36 of the other or opposing housing section 25 and then hooks onto the corresponding shoulder 37 to form a positive snap-fit connection between the housing sections. When the housing sections are assembled, the outer end surface of each clip portion 32 is substantially flush with the outer surface 43 of the opposite housing section, as shown in FIG. 3. The pins 41 of each housing section 25 also project into the corresponding holes 39 of the opposite housing section to assure precise alignment between the mating housing sections.

As mentioned above, the center chamber or cavity 26 provides for receiving the knotted end portions 22

(FIG. 4) of the cord 14 and forming the cord section 18, and the opposite cord section 16 is adapted to slide within the corresponding set of aligned holes or openings 29. Thus after the looped cord 14 is slipped over the operator's wrist, the coupling device 20 is shifted along the cord section 16 in order to snug the cord around the operator's wrist.

In reference to FIG. 5, in place of having the knotted end portions 22 of the cord within the cavity 26, the end portions of the cord may be secured together by a tubular metal coupling or fitting 45 which is crimped onto the end portions of the cord. The use of the crimped fitting 45 is particularly desirable in conjunction with a relatively stiff cord 14 which can not be easily knotted within a compact space.

In FIG. 6, the coupling device is also adapted to be used in combination with a flexible looped cord 14 having knotted end portions 22 confined within the hollow handle portion 11' of a hand held portable labeling unit 12'. In this modification, the cord sections 16 and 18 cross over each other within the cavity 26 of the coupling device 20 and thereby provide for a higher sliding frictional drag of the coupling device 20 along the cord sections 16 and 18 and also eliminate the need for the cord sliding within a hole in the handle portion. It is also apparent that the cord sections 16 and 18 may be assembled within the coupling device 20 so that the cord sections do not cross over each other but extend substantially parallel straight through the coupling device 20.

From the drawing and the above description, it is apparent that a sliding coupling device constructed and assembled in accordance with the present invention, provides desirable features and advantages. For example, the coupling device 20 is simple and inexpensive in construction and may be quickly assembled onto a flexible cord, simply by snapping the housing sections 25 together with the cord section sandwiched between the housing sections within the openings 29. Furthermore, each of the housing sections 25 is adapted to be molded of a plastics material within a relatively inexpensive mold which does not require any slides for producing undercuts or openings.

As also mentioned above, the center chamber or cavity 26 of the assembled coupling device 20 provides for flexibility in assembly and for accommodating cords having different stiffnesses. That is, the opposite end portions of the cord may be terminated within the coupling device, such as by the knotted end portions 22 or by the connecting fitting 45, or the cord sections may be extended through the coupling device, either directly or in a cross-over relation as indicated in FIG. 6. It is also apparent that the coupling device may be easily disassembled, for example, to replace a cord, simply by springing one of the clip portions 32 inwardly until it releases from the corresponding shoulder 37.

While the form of sliding coupling device herein described constitutes a preferred embodiment of the invention, it is to be understood that the invention is not limited to this precise form of device, and that changes may be made therein without departing from the scope and spirit of the invention as defined in the appended claims.

The invention having thus been described, the following is claimed:

1. A coupling device for connecting a first flexible cord section of a lanyard or the like with a second flexible cord section, said device comprising a pair of housing sections disposed in opposing adjacent relation, said housing sections including means defining an internal cavity therebetween and having opposite corresponding end portions each defining a set of spaced openings extending to and connected by said cavity, said openings being constructed for receiving said cord sections and providing for relative sliding movement of at least one of said cord sections, each of said housing sections including a projecting integral hook-like clip portion disposed adjacent one side of said housing section, each of said housing sections including means defining a through aperture extending from said cavity adjacent the opposite side of said housing section for receiving said projecting clip portion of the other said housing section, and each said clip portion projecting from its corresponding said housing section across said cavity and into said aperture of the other said housing section and engaging said other housing section to fasten said housing sections together with said cord sections disposed therebetween within said openings.

2. A coupling device as defined in claim 1 wherein said cord sections comprise sections of a continuous cord loop having opposite end portions projecting into said cavity through two of said openings, and each of said end portions of said cord is tied to form a knotted end portion within said cavity.

3. A coupling device as defined in claim 1 wherein said cord sections comprise sections of a continuous cord loop having opposite end portions projecting into said cavity, and a tubular metal fitting disposed within said cavity and crimped to said opposite end portions of said cord.

4. A coupling device as defined in claim 1 wherein said cord sections cross over each other within said cavity for increasing the sliding drag friction between said coupling device and said cord sections.

5. A coupling device as defined in claim 1 wherein one of said side portions of each of said housing sections includes at least one projecting locating pin, and said opposite side portion of said housing section defines a hole for receiving said locating pin of the other said housing section.

6. A coupling device as defined in claim 1 wherein said housing sections are substantially identical in construction and configuration, and each said housing section comprises a body of molded plastics material.

7. A coupling device as defined in claim 1 wherein each said aperture is partly defined by a shoulder recessed within the corresponding housing section, and said clip portion of each said housing section engages said shoulder of the other housing section.

8. A coupling device for connecting a first flexible cord section of a lanyard or the like with a second flexible cord section, said device comprising a pair of mating housing sections disposed in opposing adjacent relation, said housing sections including means defining an internal cavity therebetween and having opposite corresponding end portions each defining a set of spaced openings extending to and connected by said cavity, said openings being constructed for receiving said cord sections and providing for relative sliding movement of at least one of said cord sections, each of said housing sections including a projecting integral hook-like clip portion disposed adjacent one side thereof, each of said housing sections having an outer surface and including means defining a through aperture disposed adjacent the opposite side of said housing section and extending from said cavity to said outer surface thereof for receiving said projecting clip portion of the other said housing section, each said clip portion projecting into said aperture of the other said housing section and engaging said other housing section to fasten said housing sections together with said cord sections disposed therebetween within said openings, and each of said clip portions has an outer end surface disposed generally flush with said outer surface of the other said housing section.

9. A coupling device for connecting a first flexible cord section of a lanyard or the like with a second flexible cord section, said device comprising a pair of mating housing sections disposed in opposing adjacent relation, said housing sections including means defining an internal cavity therebetween and having opposite corresponding end portions each defining a set of spaced openings extending to said cavity, said openings receiving opposite end portions of one of said cord sections and providing for relative sliding movement of the other said cord section, one of said housing sections including a projecting integral hook-like clip portion disposed adjacent one side thereof, the other of said housing sections including means defining a through aperture adjacent one side thereof for receiving the projecting clip portion of the other said housing section, said clip portion engaging said other housing section to fasten said housing sections together with said cord sections disposed therebetween within said openings, and a tubular metal fitting disposed within said cavity and crimped to said opposite end portions of said one cord section.

* * * * *